United States Patent [19]
Caldara et al.

[11] Patent Number: 5,982,771
[45] Date of Patent: Nov. 9, 1999

[54] CONTROLLING BANDWIDTH ALLOCATION USING A PACE COUNTER

[75] Inventors: Stephen A. Caldara, Sudbury; Stephen A. Hauser, Burlington; Thomas A. Manning, Northboro; Raymond L. Strouble, Westford, all of Mass.

[73] Assignees: Fujitsu Network Communications, Inc., Richardson, Tex.; Fujitsu Limited, Kawasaki, Japan

[21] Appl. No.: 08/683,154

[22] Filed: Jul. 18, 1996

Related U.S. Application Data

[60] Provisional application No. 60/001,498, Jul. 19, 1995.

[51] Int. Cl.⁶ .................................................. H04L 12/56
[52] U.S. Cl. .......................... 370/389; 370/413; 370/428
[58] Field of Search .................................... 370/412, 413, 370/415, 230, 231, 235, 356, 355, 392, 429, 401, 389, 395, 396, 397, 400, 409, 428, 414, 416, 468

[56] References Cited

U.S. PATENT DOCUMENTS

| | | | |
|---|---|---|---|
| 3,804,991 | 4/1974 | Hammond et al. | 179/26 |
| 3,974,343 | 8/1976 | Cheney et al. | 179/18 ES |
| 4,069,399 | 1/1978 | Barrett et al. | 179/15 AL |
| 4,603,382 | 7/1986 | Cole et al. | 364/200 |
| 4,715,030 | 12/1987 | Koch et al. | 370/85 |
| 4,727,537 | 2/1988 | Nichols | 370/85 |
| 4,737,953 | 4/1988 | Koch et al. | 370/94 |
| 4,797,881 | 1/1989 | Ben-Artzi | 370/88 |
| 4,821,034 | 4/1989 | Anderson et al. | 340/825.8 |
| 4,837,761 | 6/1989 | Isono et al. | 370/60 |
| 4,849,968 | 7/1989 | Turner | 370/94 |
| 4,870,641 | 9/1989 | Pattavina | 370/60 |
| 4,872,159 | 10/1989 | Hemmady et al. | 370/60 |

(List continued on next page.)

FOREIGN PATENT DOCUMENTS 484943  3/1992  Japan .

OTHER PUBLICATIONS

H.T. Kung and K. Chang, Receiver-Oriented Adaptive Buffer Allocation in Credit-Based Flow Control for ATM Networks, *Proceedings of INFOCOM '95*, Apr. 2–6, 1995, pp. 1–14.

H.T. Kung, et al., Credit-Based Flow Control for ATM Networks: Credit Update Protocol, Adaptive Credit Allocation, and Statistical Multiplexing, Proceedings of ACM SIGCOMM '94 Symposium on Communications Architectures, *Protocols and Applications*, Aug. 31–Sep. 2, 1994, pp. 1–14.

An Ascom Timplex White Paper, *Meeting Critical Requirements with Scalable Enterpsie Networking Solutions Based on a Unified ATM Foundation*, pp. 1–12, Apr. 1994.

(List continued on next page.)

*Primary Examiner*—Chau Nguyen
*Assistant Examiner*—Kenneth Vanderpuye
*Attorney, Agent, or Firm*—Weingarten, Schurgin, Gagnebin & Hayes LLP

[57] ABSTRACT

A method and apparatus is disclosed for allocating bandwidth within a network switch having a plurality of input ports coupled to a plurality of output ports through a switch fabric to assure that a minimum bandwidth is allocated for predetermined scheduling lists. A switch allocation table is provided for each of a plurality of input ports. Each switch allocation table is organized as a circular table which is sequentially indexed via an associated index counter. Respective entries in the switch allocation table comprise scheduling list numbers which serve to identify cells requiring switch bandwidth. The respective index counters are synchronized such that all switch allocation tables have a corresponding entry selected. The amount of bandwidth and delay through the network switch is controlled for each of the scheduling lists based upon the number and spacing of entries in the respective switch allocation table. Latency through the network switch is significantly reduced via the use of a pace counter and a pace limit which, in cooperation with the switch allocation table, determine whether a cell associated with a particular scheduling list may be dispatched through the switch fabric for transmittal onto a network link by at least one of the output ports.

36 Claims, 6 Drawing Sheets

U.S. PATENT DOCUMENTS

| | | | |
|---|---|---|---|
| 4,872,160 | 10/1989 | Hemmady et al. | 370/60 |
| 4,878,216 | 10/1989 | Yunoki | 370/60 |
| 4,888,765 | 12/1989 | Dyke | 370/458 |
| 4,893,302 | 1/1990 | Hemmady et al. | 370/60 |
| 4,893,307 | 1/1990 | McKay et al. | 370/94.1 |
| 4,894,824 | 1/1990 | Hemmady et al. | 370/58.3 |
| 4,897,841 | 1/1990 | Gang, Jr. | 370/85.13 |
| 4,899,333 | 2/1990 | Roediger | 370/60 |
| 4,920,531 | 4/1990 | Isono et al. | 370/60 |
| 4,922,503 | 5/1990 | Leone | 370/85.13 |
| 4,933,938 | 6/1990 | Sheehy | 370/85.13 |
| 4,947,390 | 8/1990 | Sheehy | 370/85.13 |
| 4,953,157 | 8/1990 | Franklin et al. | 370/60 |
| 4,956,839 | 9/1990 | Torii et al. | 370/60 |
| 4,958,341 | 9/1990 | Hemmady et al. | 370/60.1 |
| 4,979,100 | 12/1990 | Makris et al. | 364/200 |
| 4,993,018 | 2/1991 | Hajikano et al. | 370/60 |
| 5,021,949 | 6/1991 | Morten et al. | 364/200 |
| 5,029,164 | 7/1991 | Goldstein et al. | 370/95.1 |
| 5,060,228 | 10/1991 | Tsutsui et al. | 370/85.13 |
| 5,067,123 | 11/1991 | Hyodo et al. | 370/58.1 |
| 5,070,498 | 12/1991 | Kakuma et al. | 370/60 |
| 5,083,269 | 1/1992 | Syobatake et al. | 395/425 |
| 5,084,867 | 1/1992 | Tachibana et al. | 370/60 |
| 5,084,871 | 1/1992 | Carn et al. | 370/94.1 |
| 5,090,011 | 2/1992 | Fukuta et al. | 370/60 |
| 5,090,024 | 2/1992 | Vander Mey et al. | 375/1 |
| 5,093,912 | 3/1992 | Dong et al. | 395/650 |
| 5,115,429 | 5/1992 | Hluchyj et al. | 370/84 |
| 5,119,369 | 6/1992 | Tanabe et al. | 370/60 |
| 5,119,372 | 6/1992 | Verbeek | 370/85.3 |
| 5,128,932 | 7/1992 | Li | 370/60 |
| 5,130,975 | 7/1992 | Akata | 370/60 |
| 5,130,982 | 7/1992 | Ash et al. | 370/85.7 |
| 5,132,966 | 7/1992 | Hayano et al. | 370/79 |
| 5,146,474 | 9/1992 | Nagler et al. | 375/10 |
| 5,146,560 | 9/1992 | Goldberg et al. | 385/200 |
| 5,150,358 | 9/1992 | Punj et al. | 370/84 |
| 5,151,897 | 9/1992 | Suzuki | 370/85.13 |
| 5,157,657 | 10/1992 | Potter et al. | 370/85 |
| 5,163,045 | 11/1992 | Caram et al. | 370/60.1 |
| 5,163,046 | 11/1992 | Hahne et al. | 370/79 |
| 5,179,556 | 1/1993 | Turner | 370/94.1 |
| 5,179,558 | 1/1993 | Thacker et al. | 370/94.3 |
| 5,185,743 | 2/1993 | Murayama et al. | 370/110.1 |
| 5,191,582 | 3/1993 | Upp | 370/94.1 |
| 5,191,652 | 3/1993 | Dias et al. | 395/200 |
| 5,193,151 | 3/1993 | Jain | 395/200 |
| 5,197,067 | 3/1993 | Fujimoto et al. | 370/94.1 |
| 5,198,808 | 3/1993 | Kudo | 340/825.8 |
| 5,199,027 | 3/1993 | Barri | 370/60 |
| 5,239,539 | 8/1993 | Uchida et al. | 370/58.3 |
| 5,253,247 | 10/1993 | Hirose et al. | 370/14 |
| 5,253,248 | 10/1993 | Dravida et al. | 370/16 |
| 5,255,264 | 10/1993 | Cotton et al. | 370/24 |
| 5,255,266 | 10/1993 | Watanabe et al. | 370/60.1 |
| 5,257,311 | 10/1993 | Naito et al. | 380/48 |
| 5,258,979 | 11/1993 | Oomuro et al. | 370/95.1 |
| 5,265,088 | 11/1993 | Takigawa et al. | 370/15 |
| 5,267,232 | 11/1993 | Katsube et al. | 370/17 |
| 5,268,897 | 12/1993 | Komine et al. | 370/60 |
| 5,271,010 | 12/1993 | Miyake et al. | 370/94.1 |
| 5,272,697 | 12/1993 | Fraser et al. | 370/61 |
| 5,274,641 | 12/1993 | Shobatake et al. | 370/94.1 |
| 5,274,768 | 12/1993 | Traw et al. | 395/275 |
| 5,280,469 | 1/1994 | Taniguchi et al. | 370/13 |
| 5,280,470 | 1/1994 | Buhrke et al. | 370/13 |
| 5,282,201 | 1/1994 | Frank et al. | 370/94.1 |
| 5,283,788 | 2/1994 | Morita et al. | 370/110.1 |
| 5,285,446 | 2/1994 | Yonehara | 370/60.1 |
| 5,287,349 | 2/1994 | Hyodo et al. | 370/60.1 |
| 5,287,535 | 2/1994 | Sakagawa et al. | 370/60 |
| 5,289,462 | 2/1994 | Ahmadi et al. | 370/60.1 |
| 5,289,463 | 2/1994 | Mobasser | 370/68.1 |
| 5,289,470 | 2/1994 | Chang et al. | 370/94.1 |
| 5,291,481 | 3/1994 | Doshi et al. | 370/79 |
| 5,291,482 | 3/1994 | McHarg et al. | 370/60 |
| 5,295,134 | 3/1994 | Yoshimura et al. | 370/16 |
| 5,301,055 | 4/1994 | Bagchi et al. | 359/139 |
| 5,301,184 | 4/1994 | Uriu et al. | 370/60 |
| 5,301,190 | 4/1994 | Tsukuda et al. | 370/66 |
| 5,301,193 | 4/1994 | Toyofuku et al. | 370/94.1 |
| 5,303,232 | 4/1994 | Faulk, Jr. | 370/94 |
| 5,305,311 | 4/1994 | Lyles | 370/60 |
| 5,309,431 | 5/1994 | Tominaga et al. | 370/60 |
| 5,309,438 | 5/1994 | Nakajima | 370/94.1 |
| 5,311,586 | 5/1994 | Bogart et al. | 379/221 |
| 5,313,454 | 5/1994 | Bustini et al. | 370/13 |
| 5,313,458 | 5/1994 | Suzuki | 370/56 |
| 5,315,586 | 5/1994 | Charvillat | 370/60 |
| 5,319,638 | 6/1994 | Lin | 370/60 |
| 5,321,695 | 6/1994 | Proctor et al. | 370/60 |
| 5,323,389 | 6/1994 | Bitz et al. | 370/60.1 |
| 5,333,131 | 7/1994 | Tanabe et al. | 370/54 |
| 5,333,134 | 7/1994 | Ishibashi et al. | 370/94.1 |
| 5,335,222 | 8/1994 | Kamoi et al. | 370/60 |
| 5,335,325 | 8/1994 | Frank et al. | 395/200 |
| 5,339,310 | 8/1994 | Taniguchi | 370/60 |
| 5,339,317 | 8/1994 | Tanaka et al. | 370/85.15 |
| 5,339,318 | 8/1994 | Tanaka et al. | 370/110.1 |
| 5,341,366 | 8/1994 | Soumiya et al. | 370/17 |
| 5,341,373 | 8/1994 | Ishibashi et al. | 370/85.9 |
| 5,341,376 | 8/1994 | Yamashita | 370/99 |
| 5,345,229 | 9/1994 | Olnowich et al. | 340/825.8 |
| 5,350,906 | 9/1994 | Brody et al. | 235/379 |
| 5,355,372 | 10/1994 | Sengupta et al. | 370/60 |
| 5,357,506 | 10/1994 | Sugawara | 370/60 |
| 5,357,507 | 10/1994 | Hughes et al. | 370/60 |
| 5,357,508 | 10/1994 | Le Boudec et al. | 370/58.3 |
| 5,357,510 | 10/1994 | Norizuki et al. | 370/60.1 |
| 5,359,600 | 10/1994 | Ueda et al. | 370/60.1 |
| 5,361,251 | 11/1994 | Aihara et al. | 370/60 |
| 5,361,372 | 11/1994 | Rege et al. | 395/800 |
| 5,363,433 | 11/1994 | Isono | 379/92 |
| 5,371,893 | 12/1994 | Price et al. | 395/725 |
| 5,373,504 | 12/1994 | Tanaka et al. | 370/60.1 |
| 5,375,117 | 12/1994 | Morita et al. | 370/79 |
| 5,377,262 | 12/1994 | Bales et al. | 379/220 |
| 5,377,327 | 12/1994 | Jain et al. | 395/200 |
| 5,379,297 | 1/1995 | Glover et al. | 370/60.1 |
| 5,379,418 | 1/1995 | Shimazaki et al. | 395/575 |
| 5,390,170 | 2/1995 | Sawant et al. | 370/58.1 |
| 5,390,174 | 2/1995 | Jugel | 370/60 |
| 5,390,175 | 2/1995 | Hiller et al. | 370/60 |
| 5,392,280 | 2/1995 | Zheng | 370/60 |
| 5,392,402 | 2/1995 | Robrock, II | 395/200 |
| 5,394,396 | 2/1995 | Yoshimura et al. | 370/60 |
| 5,394,397 | 2/1995 | Yanagi et al. | 370/60.1 |
| 5,398,235 | 3/1995 | Tsuzuki et al. | 370/16 |
| 5,400,337 | 3/1995 | Munter | 370/60.1 |
| 5,402,415 | 3/1995 | Turner | 370/60 |
| 5,412,648 | 5/1995 | Fan | 370/60 |
| 5,414,703 | 5/1995 | Sakaue et al. | 370/60 |
| 5,420,858 | 5/1995 | Marshall et al. | 370/60.1 |
| 5,420,988 | 5/1995 | Elliott | 395/275 |
| 5,422,879 | 6/1995 | Parsons et al. | 370/60 |
| 5,425,021 | 6/1995 | Derby et al. | 370/54 |
| 5,425,026 | 6/1995 | Mori | 370/60 |
| 5,432,713 | 7/1995 | Takeo et al. | 364/514 |
| 5,432,784 | 7/1995 | Ozveren | 370/79 |
| 5,432,785 | 7/1995 | Ahmed et al. | 370/79 |
| 5,432,908 | 7/1995 | Heddes et al. | 395/250 |

| | | | |
|---|---|---|---|
| 5,436,886 | 7/1995 | McGill | 370/16 |
| 5,436,893 | 7/1995 | Barnett | 370/60.1 |
| 5,440,547 | 8/1995 | Easki et al. | 370/60 |
| 5,444,702 | 8/1995 | Burnett et al. | 370/60.1 |
| 5,446,733 | 8/1995 | Tsuruoka | 370/60.1 |
| 5,446,737 | 8/1995 | Cidon et al. | 370/85.5 |
| 5,446,738 | 8/1995 | Kim et al. | 370/94.2 |
| 5,448,559 | 9/1995 | Hayter et al. | 370/60.1 |
| 5,450,406 | 9/1995 | Esaki et al. | 370/60.1 |
| 5,452,296 | 9/1995 | Shimizu | 370/60.1 |
| 5,455,820 | 10/1995 | Yamada | 370/17 |
| 5,455,825 | 10/1995 | Lauer et al. | 370/413 |
| 5,457,687 | 10/1995 | Newman | 370/85.3 |
| 5,459,743 | 10/1995 | Fukuda et al. | 371/67.1 |
| 5,461,611 | 10/1995 | Drake, Jr. et al. | 370/54 |
| 5,463,620 | 10/1995 | Sriram | 370/60 |
| 5,465,331 | 11/1995 | Yang et al. | 395/200.08 |
| 5,475,679 | 12/1995 | Munter | 370/395 |
| 5,479,401 | 12/1995 | Bitz et al. | 370/60.1 |
| 5,479,402 | 12/1995 | Hata et al. | 370/60.1 |
| 5,483,526 | 1/1996 | Ben-Nun et al. | 370/60.1 |
| 5,485,453 | 1/1996 | Wahlman et al. | 370/16 |
| 5,485,455 | 1/1996 | Dobbins et al. | 370/60 |
| 5,487,063 | 1/1996 | Kakuma et al. | 370/56 |
| 5,488,606 | 1/1996 | Kakuma et al. | 370/16 |
| 5,491,691 | 2/1996 | Shtayer et al. | 370/395 |
| 5,491,694 | 2/1996 | Oliver et al. | 370/85.4 |
| 5,493,566 | 2/1996 | Ljungberg et al. | 370/60 |
| 5,497,369 | 3/1996 | Wainwright | 370/60 |
| 5,499,238 | 3/1996 | Shon | 370/399 |
| 5,500,858 | 3/1996 | McKeown | 370/412 |
| 5,504,741 | 4/1996 | Yamanaka et al. | 370/58.2 |
| 5,504,742 | 4/1996 | Kakuma et al. | 370/60.1 |
| 5,506,834 | 4/1996 | Sekihata et al. | 370/17 |
| 5,506,839 | 4/1996 | Hatta | 370/60 |
| 5,506,956 | 4/1996 | Cohen | 395/182.04 |
| 5,509,001 | 4/1996 | Tachibana et al. | 370/17 |
| 5,509,007 | 4/1996 | Takashima et al. | 370/60.1 |
| 5,513,134 | 4/1996 | Cooperman et al. | 365/49 |
| 5,513,178 | 4/1996 | Tanaka | 370/58.2 |
| 5,513,180 | 4/1996 | Miyake et al. | 370/60.1 |
| 5,515,359 | 5/1996 | Zheng | 370/13 |
| 5,517,495 | 5/1996 | Lund et al. | 370/60 |
| 5,519,690 | 5/1996 | Suzuka et al. | 370/17 |
| 5,521,905 | 5/1996 | Oda et al. | 370/17 |
| 5,521,915 | 5/1996 | Dieubonne et al. | 370/60.1 |
| 5,521,916 | 5/1996 | Choudhury et al. | 370/60.1 |
| 5,521,917 | 5/1996 | Watanabe et al. | 370/1 |
| 5,521,923 | 5/1996 | Willmann et al. | 370/94.1 |
| 5,523,999 | 6/1996 | Takano et al. | 370/58.2 |
| 5,524,113 | 6/1996 | Gaddis | 370/60.1 |
| 5,526,344 | 6/1996 | Diaz et al. | 370/16 |
| 5,528,588 | 6/1996 | Bennett et al. | 370/60 |
| 5,528,590 | 6/1996 | Iidaka et al. | 370/60.1 |
| 5,528,591 | 6/1996 | Lauer | 370/79 |
| 5,530,695 | 6/1996 | Dighe et al. | 370/17 |
| 5,533,009 | 7/1996 | Chen | 370/323 |
| 5,533,020 | 7/1996 | Byrn et al. | 370/60.1 |
| 5,535,196 | 7/1996 | Aihara et al. | 370/60 |
| 5,535,197 | 7/1996 | Cotton | 370/60 |
| 5,537,394 | 7/1996 | Abe et al. | 370/17 |
| 5,541,912 | 7/1996 | Choudhury et al. | 370/17 |
| 5,544,168 | 8/1996 | Jeffrey et al. | 370/60 |
| 5,544,169 | 8/1996 | Norizuki et al. | 370/60.1 |
| 5,544,170 | 8/1996 | Kasahara | 370/84 |
| 5,546,389 | 8/1996 | Wippenbeck et al. | 370/60 |
| 5,546,391 | 8/1996 | Hochschild et al. | 370/60 |
| 5,546,392 | 8/1996 | Boal et al. | 370/60 |
| 5,550,821 | 8/1996 | Akiyoshi | 370/60.1 |
| 5,550,823 | 8/1996 | Irie et al. | 370/60.1 |
| 5,553,057 | 9/1996 | Nakayama | 370/13 |
| 5,553,068 | 9/1996 | Aso et al. | 370/60 |
| 5,555,243 | 9/1996 | Kakuma et al. | 370/58.2 |
| 5,555,265 | 9/1996 | Kakuma et al. | 370/60 |
| 5,557,607 | 9/1996 | Holden | 370/58.2 |
| 5,568,479 | 10/1996 | Watanabe et al. | 370/60.1 |
| 5,570,361 | 10/1996 | Norizuki et al. | 370/60.1 |
| 5,570,362 | 10/1996 | Nishimura | 370/60.1 |
| 5,572,522 | 11/1996 | Calamvokis et al. | 370/60.1 |
| 5,577,032 | 11/1996 | Sone et al. | 370/58.3 |
| 5,577,035 | 11/1996 | Hayter et al. | 370/60 |
| 5,579,302 | 11/1996 | Banks | 370/397 |
| 5,579,312 | 11/1996 | Regache | 370/397 |
| 5,583,857 | 12/1996 | Soumiya et al. | 370/233 |
| 5,583,858 | 12/1996 | Hanaoka | 370/392 |
| 5,583,861 | 12/1996 | Holden | 370/395 |
| 5,590,132 | 12/1996 | Ishibashi et al. | 370/236 |
| 5,602,829 | 2/1997 | Nie et al. | 370/235 |
| 5,610,913 | 3/1997 | Tomonaga et al. | 370/219 |
| 5,619,502 | 4/1997 | Kahn et al. | 370/397 |
| 5,623,405 | 4/1997 | Isono | 395/230 |
| 5,625,846 | 4/1997 | Kobayakawa et al. | 395/872 |
| 5,631,908 | 5/1997 | Saxe | 370/398 |
| 5,633,861 | 5/1997 | Hanson et al. | 370/232 |
| 5,696,764 | 12/1997 | Soumiya et al. | 370/395 |
| 5,706,288 | 1/1998 | Radhakrishnan et al. | 370/391 |

OTHER PUBLICATIONS

Douglas H. Hunt, *ATM Traffic Management—Another Perspective*, Business Communications Review, Jul. 1994.

Richard Bubenik et al., *Leaf Initiated Join Extensons*, Technical Committee, Signalling Subworking Group, ATM Forum/94–0325R1, Jul. 1, 1994.

Douglas H. Hunt et al., *Flow Control Virtual Connections Proposal for ATM Traffic Management (Revision R2)*, Traffic Management Subworking Group, $ATM_{13}$Forum/94–0632R2, Aug. 1994.

Flavio Bonomi et al., The Rate–Based Flow Control Framework for the Available Bit Rate ATM Service, IEEE Network, Mar./Apr. 1995, pp. 25–39.

R. Jain, Myths About Congestion Management in High Speed Networks, Internetworking Research and Experience, vol. 3, 101–113 (1992).

Douglas H. Hunt et al., *Credit–Based FCVC Proposal for ATM Traffic Management (Revision R1)*, ATM Forum Technica Committe Traffic Management Subworkinhg Group, ATM_Forum/94–0168R1, Apr. 28, 1994.

Douglas H. Hunt et al., *Action Item Status for Credit–Based FCVC Proposal*, ATM Forum Technical committee Traffic Management Subworking Group, ATM_Forum/94/0439, Apr. 28, 1994.

Timothy P. Donahue et al., *Arguments in Favor of Continuing Phase 1 as the Initial ATM Forum P–NNI Routing Protocol Implementation*, ATM Forum Technical Commitee, ATM Forum/94–0460, Apr. 28, 1994.

Richard Bubenick et al., *Leaf Initiated Join Extensions*, Technical Committee, Signalling Subworking Group, ATM Forum/94–0325, Apr. 28, 1994.

Rob Coltun et al., *PRP: A P–NNI Routing Protocol Proposal*, ATM Forum Technical Committee, ATM_Forum/94–0492, Apr. 28, 1994.

Richard Bubenik et al., *Leaf Initiated Join Extensions*, ATM Forum Technical Committee, Signalling Subworking Group, ATM Forum 94–0325, Apr. 28, 1994.

Richard Bubenik et al., *Requirements For Phase 2 Signaling Protocol*, ATM Forum Technical Committee, Signalling Subworking Group, ATM Forum 94–1078, Jan. 1, 1994.

SITA, ATM RFP: C–Overall Technical Requirements, Sep. 1994.

Head of Line Arbitration in ATM Switches with Input–Output Buffering and Backpressure Control. By Hosein F. Badran and H. T. Mouftah, *GLOBECOM '91*, pp. 0347–0351.

CONTROLLING BANDWIDTH ALLOCATION USING A PACE COUNTER

RELATED APPLICATION

A claim of priority is made to provisional application Ser. No. 60/001,498 entitled Communication Method and Apparatus, filed Jul. 19, 1995.

FIELD OF THE INVENTION

This invention relates to telecommunications and more specifically to a method and apparatus for controlling delay and bandwidth allocation in a network switch.

BACKGROUND OF THE INVENTION

Network switches, such as Asynchronous Transfer Mode (ATM) network switches, are employed to route received network traffic received on one of a plurality of input ports to one or more of a plurality of output ports for delivery ultimately to an intended destination or destinations over a network communications link. Input ports of the network switch may support a number of unidirectional physical links over which network traffic is received and output ports of the switch may likewise support a plurality of unidirectional physical links over which network traffic is transmitted.

In an ATM network switch, the data streams comprise pluralities of ATM cells. Multiple cell streams involving different data sources and destinations may be multiplexed on any given link. The cell streams, referred to as connections, are differentiated by fields which are contained in the cell header.

Cell reception at a network switch is largely non-deterministic and bursty in nature. Thus, large numbers of cells may be received at a network switch which need to be quickly routed from the respective input port to the appropriate output port or ports of the switch. Moreover, cells may be received over the various links which are competing for the same switch bandwidth. The network switch must manage such network traffic such that traffic which needs access to greater switch bandwidth are afforded such bandwidth while not starving other traffic which also needs access to the switch bandwidth.

Additionally, different types of network traffic have different service needs. For some types of traffic, such as video and audio traffic, a minimum bandwidth within the network switch must be assured and minimum delays must be maintained to faithfully reproduce the signal at the destination. Other types of data traffic are not subject to the same requirements.

For the above reasons it would be desirable to have a network switch which efficiently allocates the available switch bandwidth while assuring that minimum bandwidth and delay requirements of connections are satisfied.

SUMMARY OF THE INVENTION

In accordance with the present invention, a method and apparatus are disclosed for scheduling access to the available bandwidth within a network switch, such as an ATM network switch, having a plurality of input ports through which cells are received, a plurality of output ports for transmitting cells over a communication link, and a switch fabric for selectively forwarding cells received at each of the input ports to one or more of the output ports.

Cell streams for a plurality of connections are received at respective input ports of the network switch having a plurality of port processors comprising a To Switch Port processor (TSPP), a From Switch Port Processor (FSPP) and Data Serial Interface. More specifically, the TSPP is responsible for handling incoming data streams and the FSPP is responsible for handling outgoing data streams. The connection identification for each received cell is identified by parsing information contained in the cell header. Following parsing of the cell header and identification of the cell, the cell is placed on a queue associated with a scheduling list within the network switch if a cell buffer is available. If a cell buffer is unavailable, the cell is discarded and a statistics counter is updated or alternatively, the cell is forwarded to a system control module for further processing.

Network switch bandwidth is divided into allocated and dynamic bandwidth. Allocated bandwidth is that network switch bandwidth which is guaranteed to be available to a scheduling list. The allocated bandwidth for each scheduling list is preassigned as a switch administration function and may be changed under the control of network switch administration software. If a single connection is assigned to a scheduling list, that connection will have the ability to utilize the full amount of the allocated bandwidth. If multiple connections are assigned to a scheduling list, those connections will share the bandwidth assigned to the respective scheduling list.

The assignment of unallocated and unused allocated bandwidth (collectively referred to as "dynamic bandwidth") depends upon the instantaneous utilization of the switch resources. More specifically, dynamic bandwidth is shared by those connections which do not have allocated bandwidth and additionally may be shared by connections which have allocated bandwidth.

In the presently disclosed network, allocated bandwidth is managed using a time slot generator in conjunction with a pacing technique. Bandwidth is overallocated to specified scheduling lists by assigning additional time slots to such lists, however, the pacing mechanism prevents the scheduling lists from using more than their respective designated bandwidth (which constitutes less than all of the allocated timeslots).

A plurality of tables, known as switch allocation tables (SATs) are stored in memory within the switch. One such table is associated with each port processor within the network switch. The SATs, in conjunction with various scheduling lists and queues, are used in the determination of which cells will be dispatched from respective input ports through the switch fabric to the output ports on a cell time by cell time basis. The entries within the respective SAT's contain scheduling list numbers which are used to select a queue assigned to a particular connection, i.e., the connection that will gain access to the switch fabric during the respective cell time. Additionally, a lookup table is maintained within the switch by administration software to map the respective connections to the various output ports.

All of the SATs within the network switch have the same length table. Each SAT index counter produces an address output in response to a cell clock input. The address outputs of the respective SAT index counters are coupled to respective address inputs of the SATs to selectively address one of the entries within each SAT within each cell time. The SAT's are synchronized such that the same entry within each SAT, as specified by the respective SAT index counter, is selected during each clock interval. The SAT index counters are continually clocked to identify successive entries within the SATs. After addressing or pointing to the last entry in the respective SATs, the SAT index counters wrap to address 0 so as to address the initial entry within the respective SATs.

The scheduling list numbers within the SATs comprise offsets which are used to index into a scheduling list table. The scheduling list table serves to identify queues associated with the respective scheduling list. Each queue comprises a FIFO which has entries pointing to one or more cells stored in a cell buffer memory and awaiting access to the switch fabric for selective forwarding from the respective input port to one or more of the output ports.

During any given cell time, no two input ports can transmit a cell to a single output port. The scheduling list numbers within the SATs are maintained by administration software such that during any given cell interval, the output ports specified by the respective scheduling list numbers in the plurality of SATs are unique. The amount of bandwidth and delay through the switch fabric is controlled by the number of entries in the respective SAT which are assigned to the respective scheduling lists.

To assure allocation of suitable bandwidth for the respective connections and maintenance of appropriate network switch delays the pacing mechanism is provided. The pacing mechanism assures that a predetermined number of entries with a SAT having a specified scheduling list number are skipped before allowing a cell from the respective scheduling list to be forwarded to one or more of the output ports.

More specifically, a table of scheduling list descriptors is provided which includes one scheduling list descriptor for each scheduling list. Each scheduling list descriptor includes information pertinent to the respective scheduling list including a pace counter field and a pace limit field. The pace limit field specifies the number of entries within the SAT having a specific scheduling list number which must be accessed after dispatching a cell from that scheduling list prior to launching another cell through the switch fabric from that scheduling list. The pace limit is programmable and is set under the control of system administration software. The pace counter field represents a count of the remaining number of times that the respective scheduling list number must be accessed before launching another cell to the switch fabric from the respective scheduling list. The pace counter for a respective scheduling list is set to the pace limit each time a cell is dispatched to the switch fabric from the respective list.

Each time the SAT index counter is incremented and a valid scheduling list number retrieved from the respective SAT, the pace counter for the respective scheduling list is decremented if the pace counter is not already set to 0. If the pace counter is equal to 0 it remains at zero until a cell is dispatched. If the pace counter is equal to 0, a cell may be launched to the switch fabric for delivery to the output port for the respective connection if a cell is queued for transmission on a queue of the respective scheduling list. When a scheduling list is established by system administration software, the pace counter is preset to 0 such that a cell will be dispatched the first time a SAT entry is accessed having the respective scheduling list number following enqueuing of a cell to a queue on that scheduling list.

Thus, the entries within the switch allocation table, in conjunction with the pace limit and counter, determine the allocated bandwidth for the respective connections identified in the SAT's and additionally reduce cell latency through the switch as a consequence of the overallocation of SAT entries for predetermined scheduling lists.

Typically, all slots within the SAT's are not allocated to scheduling lists. In the event slots within a SAT are not preassigned or allocated to a scheduling list, such slots are known as unallocated bandwidth and are available as dynamic bandwidth which may be assigned for use by connections competing for such dynamic bandwidth. In addition to the circumstance stated above in which no valid scheduling list number was assigned to a specific entry within a SAT, dynamic bandwidth is available for use in the event the respective SAT entry contains a valid scheduling list number but the pace counter does not permit a cell to be launched to the switch fabric for the respective scheduling list (pace counter is not equal to zero)(referred to as "unused allocated bandwidth") or in the event that a valid scheduling list number was present in the SAT for the respective time slot and the pace counter permitted the launching of a cell (pace counter was equal to 0) but no cell was present in the respective scheduling list's queue to be dispatched.

The foregoing scheduling technique assures that connections which need a minimum allocated bandwidth will receive that bandwidth. Additionally latency is reduced when compared to systems which utilize time slot bandwidth allocation without the presently disclosed pacing mechanism. Moreover, as a consequence of the pacing mechanism, bursty traffic is smoothed so that connections competing for resources are more likely to find dynamic bandwidth available.

DESCRIPTION OF THE DRAWING

These and other features of the present invention will be more fully understood from the following Detailed Description of the Invention in conjunction with the drawing of which.

DETAILED DESCRIPTION OF THE DRAWING

Figure 1:
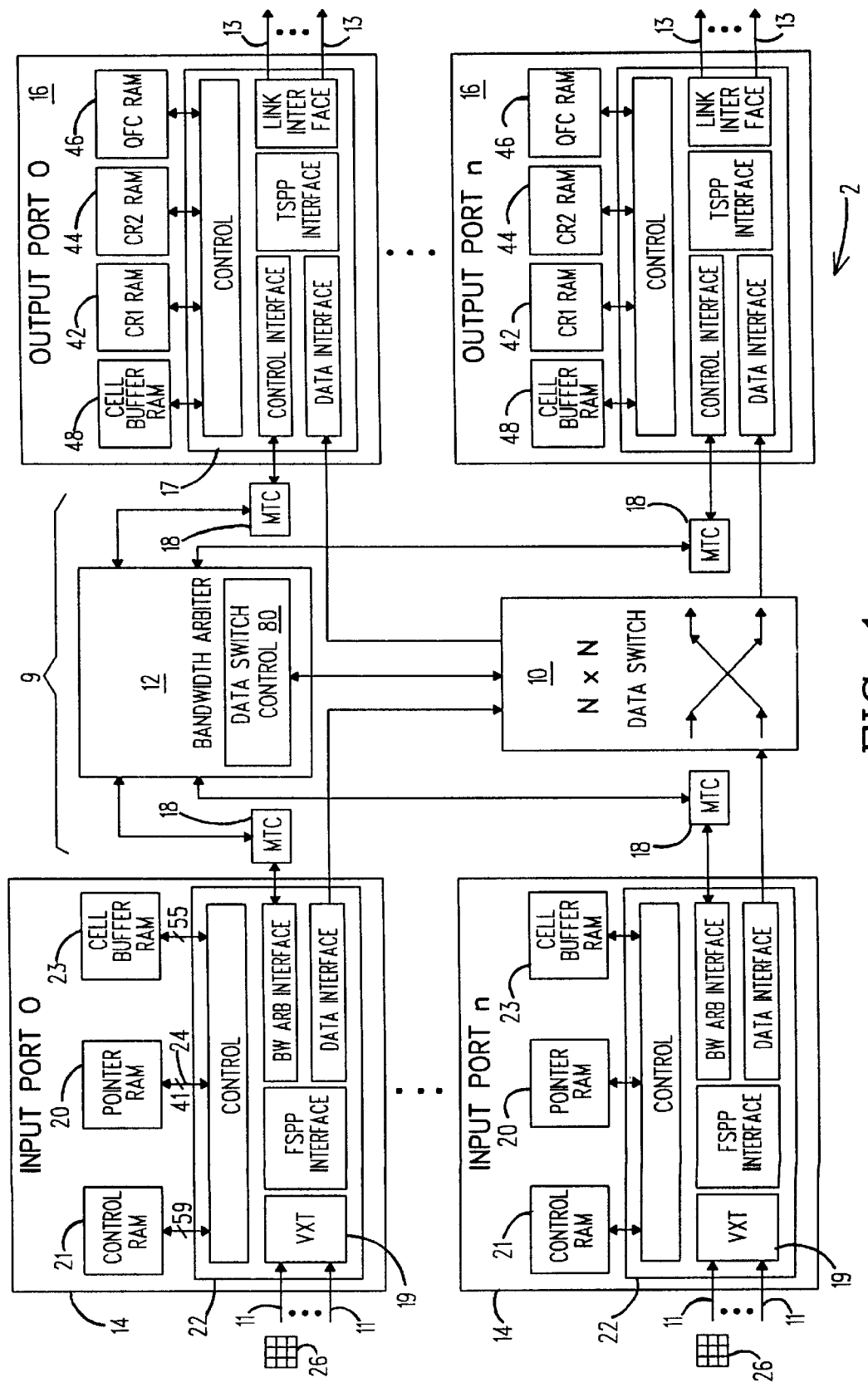
FIG. 1 is a block diagram of a network switch in accordance with the present invention.
Figure 1A:
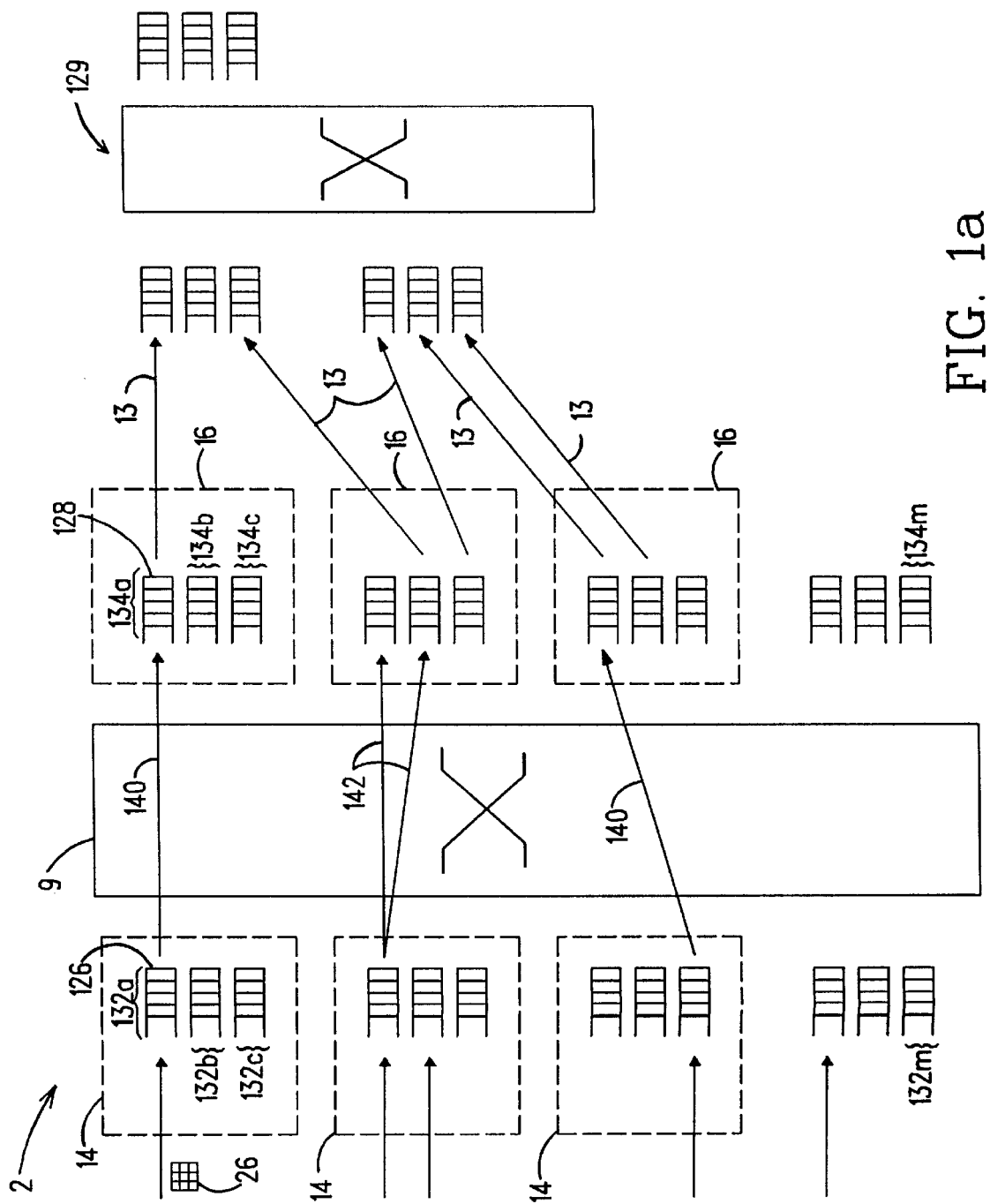
FIG. 1a is a diagram illustrating the buffer organization in the network switch of FIG. 1.

Referring to FIGS. 1 and 1a, the presently disclosed network switch 2 includes a plurality of input ports 14, a plurality of output ports 16 and an N×N switch fabric 9, coupled between the input ports 14 and output ports 16. Each input port 14 includes a To Switch Port Processor ("TSPP") ASIC 22 and each output port 16 includes a From Switch Port Processor ("FSPP") ASIC 17. A Multipoint Topology Controller ("MTC") ASIC 18 is coupled between each TSPP 22 and a Bandwidth Arbiter ("BA") ASIC 12, as well as between the bandwidth arbiter 12 and each FSPP 17, as shown. In one embodiment, each MTC 18 supports up to four TSPPs 22 or FSPPs 17.

The switch fabric 9 includes a data switch 10, such as a data crossbar switch for data cell transport, a bandwidth arbiter 12 and MTCs 18 for control signal transport. The N×N switch fabric in the present embodiment yields a throughput of approximately N×670 megabits per second. The bandwidth arbiter 12 controls, inter alia, transport of data cells from a TSPP 22 to one or more FSPPs 17 through the data switch 10 (i.e., switch port scheduling). More specifically, the bandwidth arbiter ("BA") controls switch fabric interconnection, schedules available dynamic bandwidth and resolves multipoint to point bandwidth contention. The TSPPs 22 accept streams of cells 26 as their inputs and presents another stream of cells to the data switch 10 for routing to the appropriate FSPPs 17. Each FSPP 17 receives cells from the data switch 10 and schedules transmission of those cells onto network links 13 (i.e., link scheduling). The incoming cells can be sourced by either a segmentation unit (not shown) which converts packets to cells, or alternatively cells may be sourced directly from a line interface such as an OC3 link.

Each of the input ports 14 and output ports 16 includes a plurality of input buffers 126 and output buffers 128, respectively (FIG. 1a). The buffers 126, 128 are organized into a plurality of input queues 132a–m (referred to herein generally as input queues 132) and a plurality of output queues 134a–m (referred to herein generally as output queues 134), respectively. More particularly each input port 14 includes a plurality of input queues 132 and each output port 16 includes a plurality of output queues 134, as shown. The input queues 132 are stored in a Control RAM 21 and a Pointer RAM 20 of the input port 14 and the output queues 134 are stored in a CR1 RAM 44 and a CR2 RAM 44 of the output port 16.

To traverse the switch fabric 9, a data cell 26 enters the network switch 2 through an input port 14 and is enqueued on an input queue 132 at the respective TSPP 22. The cell is then transmitted from the respective input queue 132 to one or more output queues 134 via the data switch 10. Control signals are transmitted from a TSPP 22 to one or more FSPPs 17 via the respective MTCs 18 and the bandwidth arbiter 12. In particular, data and control signals may be transmitted from an input queue 132 to a particular one of the output queues 134, in the case of a point to point connection 140. Alternatively, data and control signals may be transmitted from an input queue 132 to a selected set of output queues 134, in the case of a point to multipoint connection 142. From the output queue(s) 134, the data cell 26 is transmitted outside of the network switch 2, for example, to another switch 129 via a network link 13.

The bandwidth arbiter 12 contains a dataswitch or crossbar controller 80 which includes a probe crossbar, an XOFF crossbar and an XON crossbar, each of which is an N×N switch. A request message, or probe control signal, flows through the probe crossbar and is used to query whether or not sufficient space is available at the destination output queue, or queues 134 to enqueue a cell. The request message is considered a "forward" control signal since its direction is from a TSPP 22 to one or more FSPPs 17 (i.e, the same direction as data). A two bit control signal flows in the reverse direction (from one or more FSPPs to a TSPP) through the XOFF crossbar and responds to the request message query by indicating whether or not the destination output queue, or queues 134 are presently capable of accepting data cells and thus, whether or not the transmitting TSPP can transmit cells via the data switch 10. In the event that the XOFF control signal indicates that the queried output queue (s) 134 are not presently capable of receiving data, another reverse control signal, which flows through the XON crossbar, notifies the transmitting TSPP once space becomes available at the destination output queue(s) 134.

Each output port 16 contains four memories: a Control RAM 1 ("CR1 RAM") 42, a Control RAM 2 ("CR2 RAM") 44, a Cell Buffer RAM 48 and Quantum Flow Control RAM ("QFC RAM") 46. The Cell Buffer RAM 48 is where the actual cells are buffered while they await transmission to a network link 13. The CR1 RAM 42 and the CR2 RAM 44 contain the output queues 134, with each queue 134 containing pointers to cells in the Cell Buffer RAM 148. The CR1 RAM 42 contains information required to implement scheduling lists used to schedule link access by the output queues 134 associated with each link 13 supported by the FSPP 17. The QFC RAM 46 stores update information for transfer to another switch 129 via a network link 13. Update cells are generated in response to buffer state update information provided by a TSPP 22 and specify whether the particular TSPP 22 is presently capable of accepting data cells.

Upon receipt of a cell at the TSPP 22, a VXT processor 19 inspects the cell header and indexes into certain lookup tables to ascertain whether the cell belongs to a valid scheduling list. In the event that the cell is associated with a valid scheduling list, the cell is assigned to an input queue number. The input queue number is used to point to a queue descriptor which contains state information pertaining to the respective scheduling list. Additionally, the queue number is used to locate the cells within the Cell Buffer RAM 23 as hereinafter described. In the event that a received cell cannot be validated by the VXT processor 19 as being associated with a valid scheduling list, the cell can either be discarded or assigned to an exception queue and forwarded to a system control processor for further processing.

Switch allocation tables (SATs) in conjunction with the pacing mechanism herein described, cooperatively assure deterministic delays within the network switch and provide for the allocation of bandwidth to individual connections or groups of connections comprising a scheduling list. One switch allocation table is provided for each Input Port 14 within the Pointer Ram 20 of the respective Input Port 14. The pointer ram 20 is coupled to a To Switch Port Processor ASIC (TSPP) 22 within the Input Port 14 via control and data buses 24.

Figure 2:
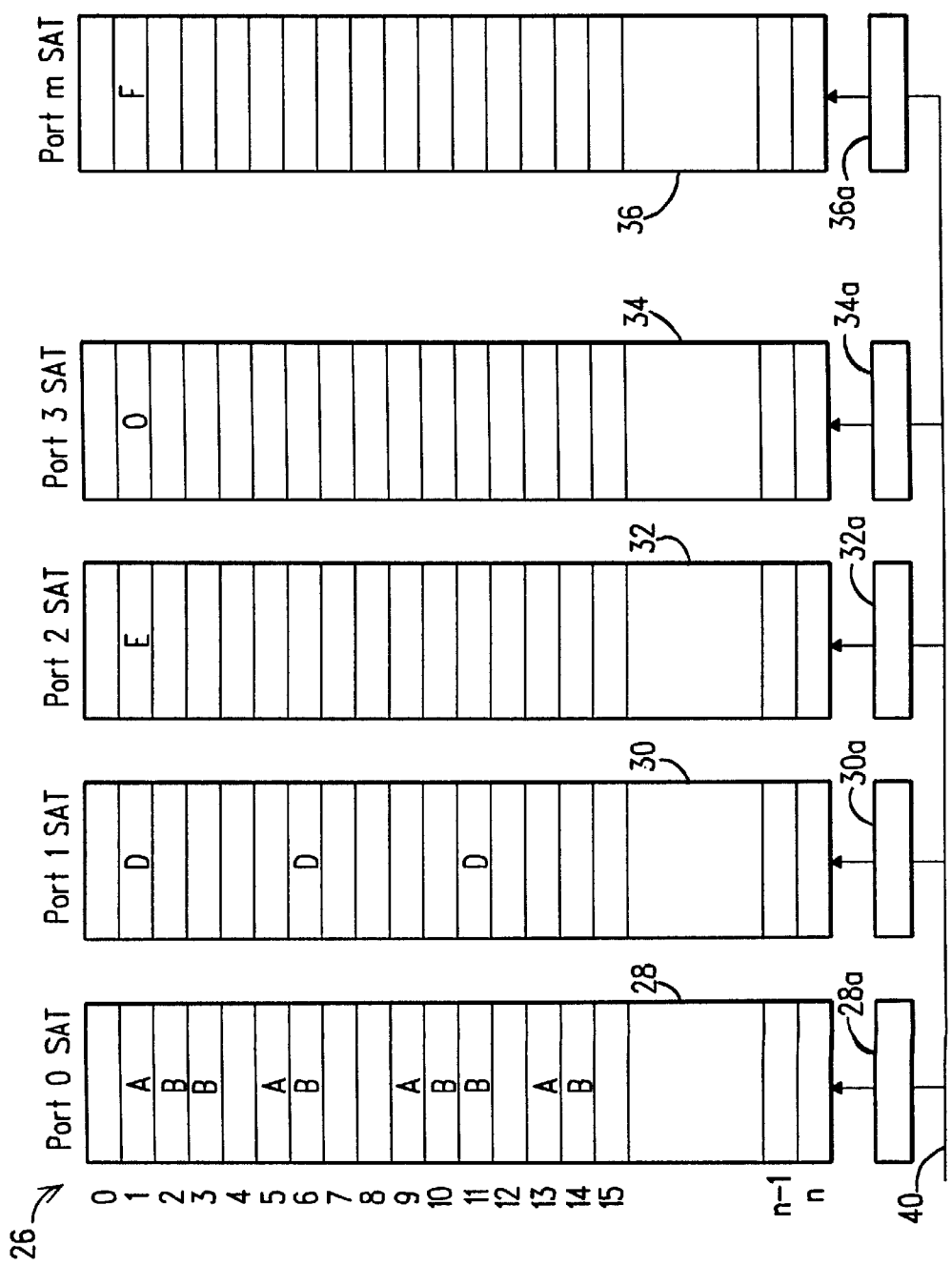
FIG. 2 is a diagram of a plurality of switch allocation tables used in accordance with the present invention.

Referring to FIG. 2, switch allocation tables (SATs) (collectively 26), are used to select scheduling lists which define cells to be dispatched through the data switch 10 on a cell time by cell time basis. All port processors operate in tandem and, for ports 0, 1, 2, 3, . . . m. use their respective SAT's 28, 30, 32, 34 . . . 36 respectively, to determine which cells to transfer through the data switch 10 of the switch fabric 9 to one or more of the plurality of output ports 16 in any given cell time slot interval.

The SATs each comprise a linear table, the entries of which comprise scheduling list numbers, such as scheduling list numbers A, B, C, D, E and F shown in SATs 26. Individual SATs 28, 30, 32, 34 and 36 are addressed by respective SAT index counters 28a, 30a, 32a, 34a and 36a, which sequentially address each entry within the respective SAT's. The respective SAT index counters 28a, 30a, 32a, 34a and 36a are synchronized as hereinafter described such that the entry associated with the same SAT address for each of the SATs will be accessed at any given instant in time. For example, referring to FIG. 2, when the SAT index counter 28a provides an output address of "1", the Port 0 SAT 28 will provide an output equal to scheduling list number "A". At the same time that the SAT index counter 28a provides an output of "1", the SAT index counter 30a for Port 1 will likewise produce an output address of "1" and the SAT 30 for Port 1 will provide an output equal to scheduling list number "D". Further, during the same time slot corresponding to address 1, the Port 2 SAT 32 will provide an output equal to scheduling list number "E", the Port 3 SAT will provide an output equal to 0 (indicating that no scheduling number has been specified for this time slot) and the Port m SAT will provide an output equal to scheduling list number "F".

The SAT index counters 28a, 30a, 32a, 34a and 36a are located within the respective TSPPs 22. In the present embodiment, the SAT index counters are 14 bits wide thereby allowing for a SAT size of 0 to 16,383 entries. The SAT size is specified by a value stored within a programmable register within the switch fabric 9 in a manner hereinafter discussed. In a preferred embodiment of the present invention, the SATs have 8192 entries, although the number of entries within the SATs may be varied based upon system requirements. The SAT index counters are thus used to address the respective SATs within each TSPP 22 to select one of the possible 8192 entries a SAT in each Input Port 14 and, as indicated above, the SATs are synchronized so that corresponding addresses of each SAT table are selected during each SAT time slot.

The SAT index counters 28a, 30a, 32a, 34a . . . 36a are incremented in response to a cell clock signal 40 which, in the present embodiment, causes the SAT index counters to increment every 635 nanoseconds. A synchronizing pulse is superimposed on the cell clock signal 40 to cause the SAT index counters to reset to zero on the first cell clock after the detection of the synchronizing pulse. The periodicity of the synchronization pulse is established by a predetermined value which is stored in a programmable register (not shown) and a counter located within the switch fabric 9. In one embodiment, the counter is loaded with the predetermined value stored in the programmable register and the counter is decremented upon the occurrence of each cell clock. The synchronizing pulse is generated when the counter reaches 0. The counter is then reloaded with the predetermined value whereupon the cycle is repeated. Alternatively, the counter may be incremented upon the occurrence of each cell clock and compared to the value stored within the programmable register. In the event the value in the counter equals the value in the programmable register, the synchronizing pulse is generated and the counter is reset to 0. The size of the SAT's is thus specified by the value stored within the programmable register since cycling through the respective SAT's will be restarted upon recognition of the synchronizing pulse.

One cell may be dispatched from each respective input port during each time slot associated with a SAT entry. Thus, assuming a 16 input port×16 output port data switch 10, and the availability of appropriate cells for dispatch, 16 cells could be launched from the respective input ports to the 16 output ports within the 635 ns cell clock interval. The time slots within the SATs thus contain entries which determine the cells which can be launched to the data switch 10 of the switch fabric 9 for eventual transmittal out of the plurality of output ports 16 under the control of the respective FSPPs 17. Since two cells cannot be transmitted to the same output port during the same interval, the output ports associated with the scheduling list numbers in the respective SATs for any given SAT index counter address output must be unique. Thus, for address 1, the output ports associated with the entries in the respective SAT's for Ports 0 through m are unique.

Figure 5:
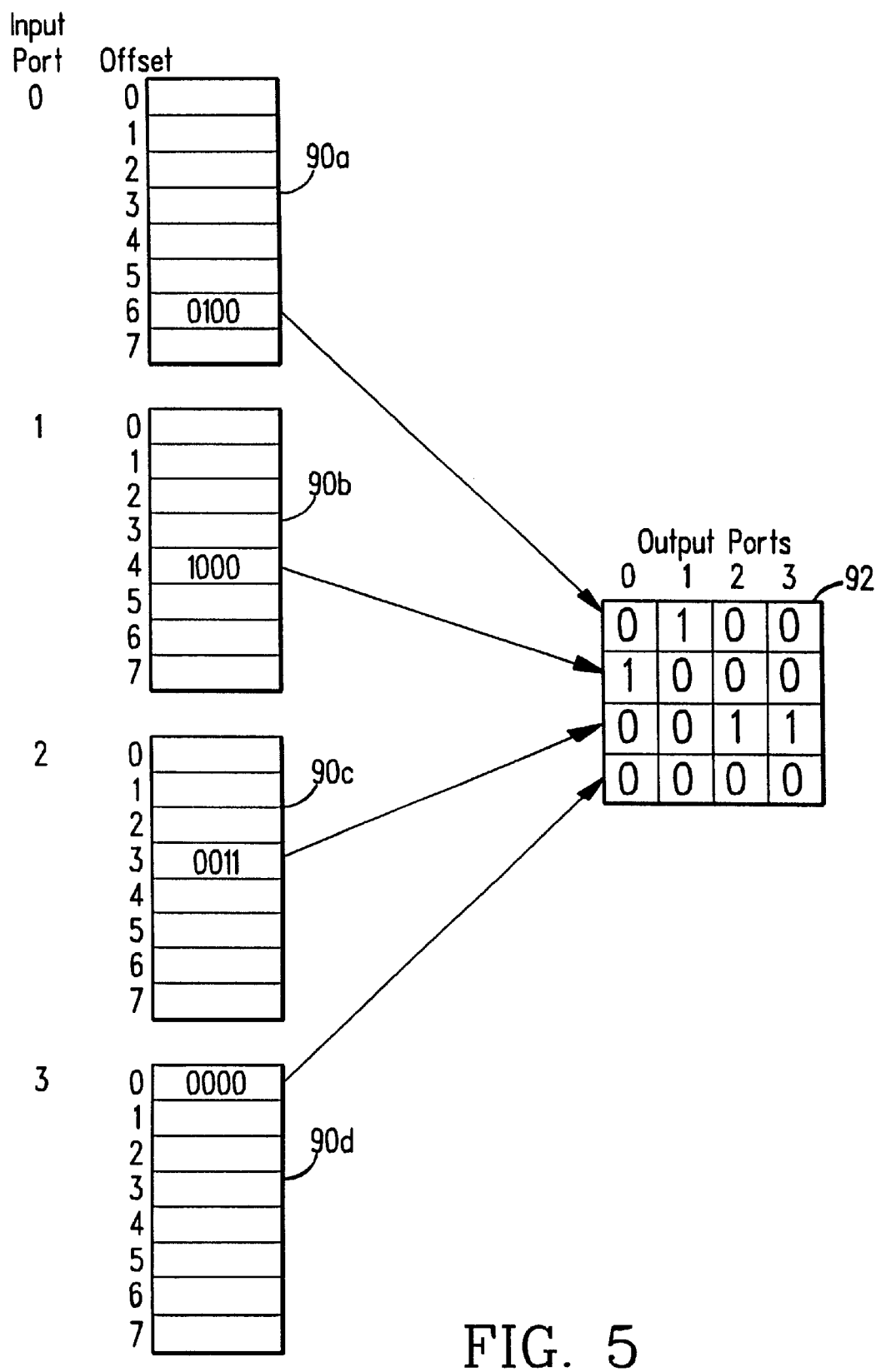
FIG. 5 is a diagram of data structures used to assure conflict avoidance in output port assignments.

FIG. 5 illustrates the mechanism by which output port conflicts are detected and avoided. The mechanism is depicted for a 4–4 switch fabric for illustrative purposes. During each time slot, each input port accesses a SAT entry. The Input Port number is prepended to the scheduling list number retrieved from the respective SAT. The Input Port number and scheduling list number are forwarded to the respective MTC 18. The MTC maintains a lookup table 90 having segments 90a, 90b, 90c and 90c which are assigned to each of the four respective input ports. The Input Port number, as illustrated in FIG. 5 is used to select one segment of the lookup table and the scheduling list number is employed as an offset into the respective segment of the lookup table 90. The lookup table contains bit vectors which identify the Output Port or Ports which are needed for the respective cell traffic. For example, referring to FIG. 5, the bit vector retrieved for Input Port 0, scheduling list number 6, indicates that Input Port 0 has traffic for Output Port 1. The bit vector for Input Port 2, scheduling list number 3 indicates that Input Port 2 seeks to forward a cell to Output Ports 2 and 3. The bit vectors for the respective Input Ports are retrieved from the lookup table 90 and assembled in a matrix 92. The matrix 92 is tested to assure that no column has more than a single entry. In the event a column of the matrix contains two or more entries, such indicates that two or more input ports are requesting access to the same output port during the respective SAT time slot. In the event such an indication of an output port conflict is obtained, exception processing is initiated. An indication of the Output Ports scheduled for each MTC is conveyed to the BA 12. Unscheduled Output Ports are scheduled for dynamic bandwidth assuring avoidance of Output Port conflicts. It should be noted that in the event the switch constituted a 16–16 switch fabric, the bit vector lookup table 90 would be 16 bits wide and the matrix 92 would constitute a 16–16 matrix.

Call administration software within the network switch is responsible for loading the respective SATs so as to avoid conflicts regarding output port usage and SAT entry assignments.

Each time the synchronizing pulse occurs, the SAT index counters reset to 0 and continue incrementing. Thus, each of the SAT tables repeatedly cycles through the respective entries in a predetermined sequence with a cell clock 40 clocking the respective SAT index counters every 635 nanoseconds. Each timeslot or SAT scheduling list entry, in the present embodiment, corresponds to approximately 64 k bits/sec of cell payload bandwidth.

Figure 3:
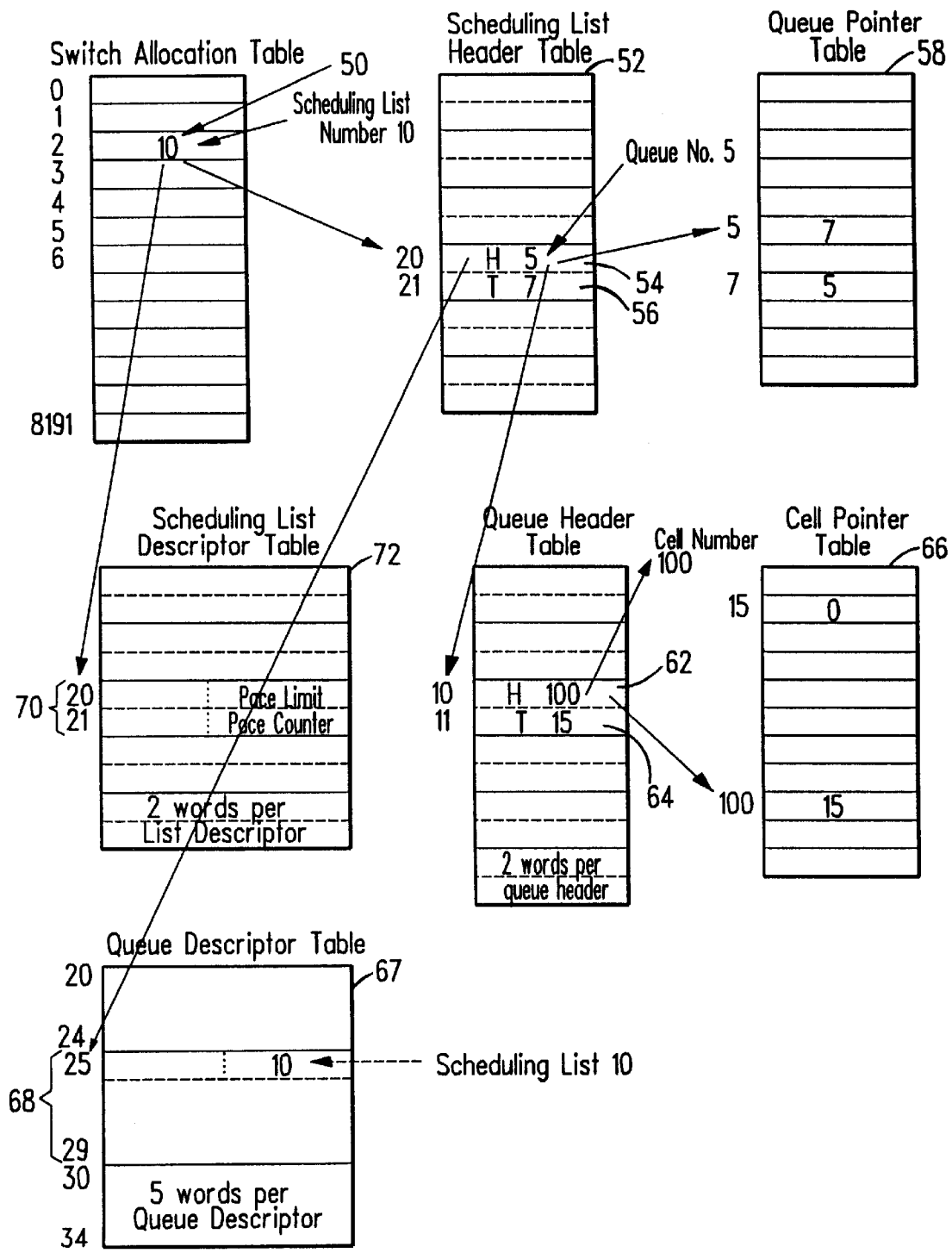
FIG. 3 is a diagram of the data structures used in conjunction with the switch allocation tables of FIG. 2.

The data structures employed to identify a specific cell which will be dispatched to the data switch 10 of the switch fabric 9 from the respective TSPP 22 are illustrated in FIG. 3. A scheduling list number 10 from one the SATs, and identified at 50, is employed as an offset into a scheduling list header table 52. The scheduling list header table 52 includes a plurality of entries each of which includes a head pointer 54 and a tail pointer 56. Thus, the scheduling list number (which in the present example is illustrated to be 10) is multiplied by 2 to obtain an offset of 20 to locate the head pointer at the 20th location within the Scheduling List Header Table 52.

It should be noted that bandwidth allocation can be assured for a single connection corresponding to a specific VPI/VCI address in an ATM environment, by assigning a single connection to a particular scheduling list which has available to it all of the bandwidth allocated via the SAT and the pacing mechanism. Alternatively, multiple connections may be assigned to a single scheduling list which share the allocated bandwidth among the connections associated with that list.

A queue number (5 in the present example) is retrieved from the Scheduling List Header Table 52. The retrieved queue number serves to identify the specific queue from which a cell will be retrieved for dispatch to the data switch 10 of the switch fabric 9. The queue number within the head pointer of the Scheduling List Header Table 52 is also used as a pointer into a Queue Pointer Table 58. The Queue Pointer Table 58 contains the queue number for the next queue on the scheduling list. Thus, in the present example, location 5 of the Queue Pointer Table 58 contains the value 7 which is the queue number for the second queue in the respective scheduling list. Since the queue number 7 equals the queue number of the tail pointer 56 at location 21 of the Scheduling List Header table 52 in the present example, queue number 7 is the last queue on scheduling list number 10.

The queue number (such as queue number 5) in the Scheduling List Header Table 52 also serves as an index into a Queue Header Table 60. The Queue Header Table is also organized with head and tail pointer pairs 62 and 64 respectively. The head pointer 62 is used as an offset into the Cell Buffer RAM 23 to locate the cell for dispatch through the data switch 10 of the switch fabric 9. The head pointer 62 also is used as an index into a Cell Pointer Table 66 to identify the location of the next cell within the respective cell queue scheduled for transmission through the data switch 10. In the present example, since the contents of location 100 contain the value of the tail pointer 64 of the queue header table 60, only two cells reside on the queue for transmission through the data switch 10.

The queue number, such as queue number 5 is also used as an offset into a Queue Descriptor Table 67 which is stored within the Control RAM 21. The Queue Descriptor Table contains one or more queue descriptors such as queue descriptor 68 which occupy five 32 bit entries within the Queue Descriptor Table. Thus, the queue number obtained from the Scheduling List Header Table 52 is multiplied by 5 to obtain the offset into the Queue Descriptor Table 67.

The queue descriptor contains an identification of the scheduling list number for the respective queue number and additionally a cell count of cells currently buffered on the respective queue. When the cell count goes to 0 following transmission of the last cell on the respective queue, the queue is removed from the Scheduling List Header Table 52 and Queue Pointer Table 58.

Once a cell has been transmitted to all of its designated output ports, the cell gets dequeued. To dequeue a cell, the Queue Header Table 60 is updated by loading the Head Pointer 62 with the contents of location 100 of the Cell Pointer Table 66. This points the queue header to the next cell to be transferred. Since there is an additional cell (the 15th cell within the cell buffer) that awaits transmission, queue number 5 within the Scheduling list Header table is not dequeued but rather, pushed to the bottom of the round robin list so that other queue numbers within the scheduling list will receive fair (round robin) access to the allocated bandwidth.

The relevant tables are updated after dispatch of a cell in the following manner. After dispatch of a cell, the contents of the Head Pointer 54 are written to a temporary register (not shown). The Head Pointer 54 is next loaded with the value of the next queue number in the scheduling list which is obtained by using the value in the temporary register as an index into the Queue Pointer Table 58 and retrieving the value at the respective location. The value in the temporary register ("5" in the present example) is next written into the location in the Queue Pointer Table 58 specified by the Tail Pointer 56 (i.e. a "5" is written into location 7 of the Queue Pointer Table 58 in the present example). Finally, the value in the temporary register is written into the Tail Pointer 56 to complete the updating of the respective tables. As a consequence of the above described table updates, the next queue on the respective scheduling list with available cells for dispatch is selected in a round robin manner. In the event that queue number 5 only included a single cell for transmission, upon dispatch of that cell to the switch fabric, queue number 5 would be dequeued, or removed, from the Scheduling List Header Table 52 instead of being pushed to the bottom of the round robin list.

The foregoing mechanism is employed to locate cells for dispatch at each Input Port 14 within each cell time. In the event that the respective SAT entry contains a "0" entry, such indicates that no allocated bandwidth has been assigned for that timeslot for the respective Input Port 14. When a "0" entry is detected within a particular SAT entry, the Bandwidth Arbiter is signaled that such timeslot is available for the use of dynamic bandwidth, i.e. cell dispatch through the switch fabric for which bandwidth has not been allocated through the SATs.

The pacing mechanism is employed in conjunction with the SATs to assure that allocated bandwidth is provided to specified scheduling lists of queues while minimizing cell latency through the network switch. The pace counter in conjunction with the pace limit is employed to permit overallocation of SAT entries to reduce the latency for cells dispatched from the respective scheduling list while preventing a scheduling list from obtaining more than its allocated bandwidth.

Latency, or delay through the switch, is a function of the amount of bandwidth allocated for a given queue or group of queues on a scheduling list. Latency is reduced by assigning more, generally evenly spaced, SAT entries for a given scheduling list and only allowing a cell to be dispatched for a particular scheduling list following retrieval of at least a predetermined number of occurrences of the respective scheduling list number in the respective SAT as explained with greater particularity below.

More specifically, a pace limit and a pace counter are associated with each scheduling list. Referring to FIG. 3, a scheduling list descriptor, such as scheduling list descriptor 70, is stored in a Scheduling List Descriptor Table 72 within the Control RAM 21. The Scheduling List Descriptor Table 72 contains all of the scheduling list descriptors for the scheduling lists assigned for the respective SAT.

The pace limit comprises a value which, in the present embodiment, is stored in a 10 bit wide pace limit field within the scheduling list descriptor. Additionally, the pace counter is stored in another 10 bit wide pace counter field of the scheduling list descriptor. The pace limit specifies the number of SAT entries for a particular scheduling list number to be skipped when making allocated requests for scheduling list numbers that are overallocated. The pacing mechanism is employed when the number of SAT entries allocated to a scheduling list is greater than the number of SAT entries needed for the allocated bandwidth requested.

Assuming for purposes of discussion that a particular scheduling list has been allocated 32 SAT entries to achieve a specific delay, but only needs four entries to achieve its requested bandwidth, the pace limit is set to 7 and the pace counter is set to zero. When a Scheduling List Descriptor within the Scheduling List Descriptor table 72 is initialized, the pace counter is set to 0 remains at equal to 0 until a cell is dispatched.

The pacing mechanism may be disabled by setting the pace limit field equal to 0. Setting the pace limit field equal to 0 will cause every valid SAT entry for the respective scheduling list to make a request for allocated bandwidth if there is a cell available for transmission from the respective scheduling list.

When the SAT index counter points to a SAT entry for the respective scheduling list, if the pace counter is equal to zero, and if the list contains no cells for dispatch, nothing is done to the pace counter and the time slot is given up to dynamic bandwidth by signalling the bandwidth arbiter. Thus, after the pace counter has been initialized to zero it remains at zero until a cell is dispatched.

Upon shipping a cell to the data switch 10 of the switch fabric 9, the pace counter is set to the value specified by the pace limit. Each successive time the respective SAT entry points to the respective scheduling list, the pace counter is tested to determine if it equals zero. If the pace count does not equal zero, the pace counter is decremented and the timeslot is assigned to dynamic bandwidth. After decrementing the pace counter, if the pace counter equals 0 and a cell is enqueued on the scheduling list for dispatch, the cell is dispatched to the data switch 10 of the switch fabric 9 and the pace counter is preset to the pace limit. If the pace counter is equal to zero, and no cell is enqueued on the respective scheduling list, the pace counter remains at zero until a cell is enqueued on the respective scheduling list. Such a cell will then be dispatched upon retrieval of the next SAT entry for the respective scheduling list. Following dispatch of the cell the pace counter is again set to the pace limit.

Figure 4:
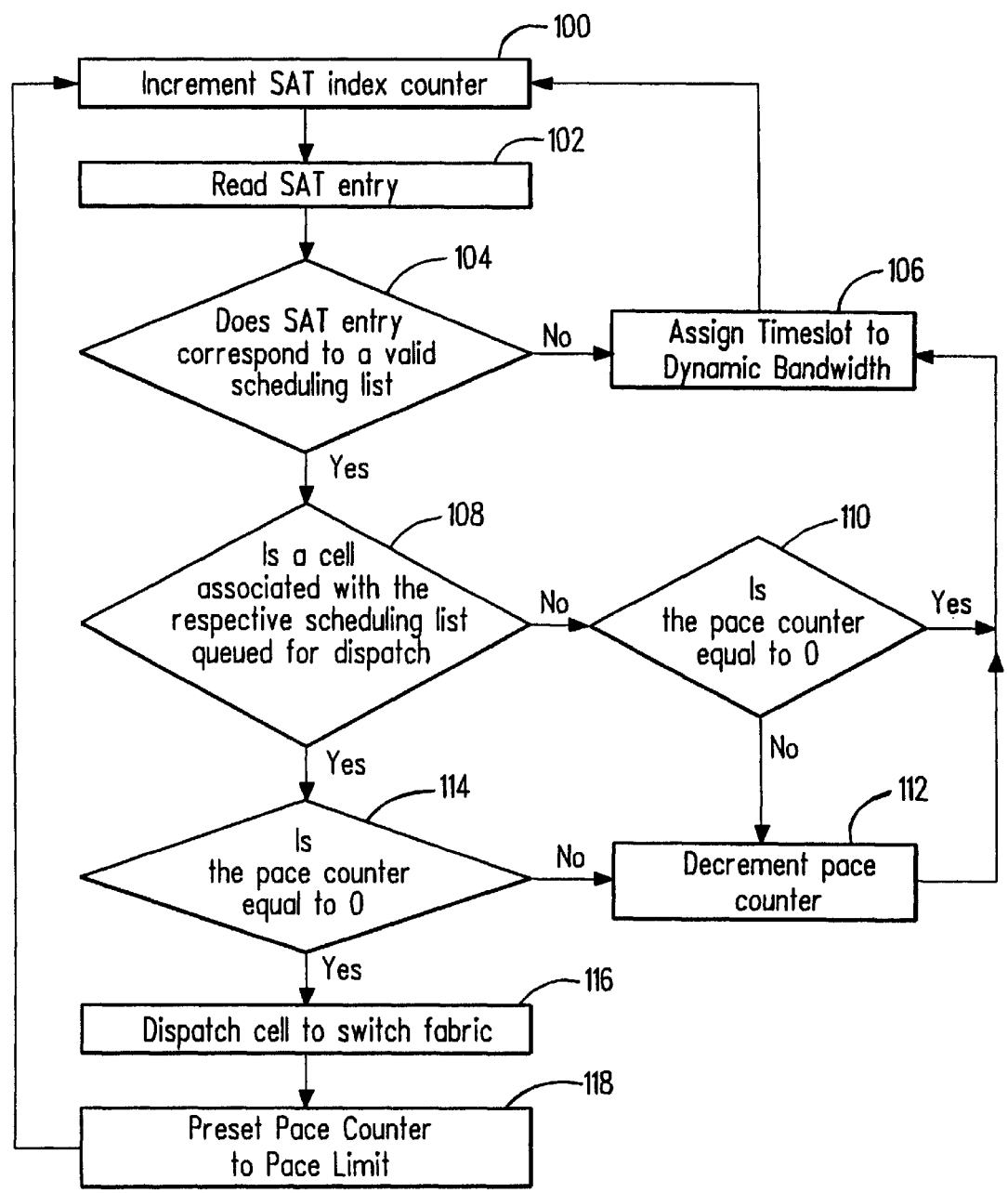
FIG. 4 is a flow diagram illustrating the pacing mechanism employed in accordance with the present invention.

The presently disclosed pacing method is further illustrated with reference to the flowchart of FIG. 4. The same method is employed in each of the TSPPs for each of the respective SATs.

The SAT index counters are incremented as indicated in step 100 to point to the next entry in the respective SAT. As indicated in step 102, the respective SAT entry is read and, as indicated in step 104, the SAT entry accessed in step 102 is tested to ascertain whether the retrieved entry corresponds to a valid scheduling list. As indicated in step 106, if the SAT entry does not correspond to a valid scheduling list, the respective SAT timeslot is assigned to Dynamic Bandwidth. The Bandwidth Arbiter is signaled with respect to the availability of the respective timeslot and as indicated in step 100, the SAT index counter is incremented on the next cell clock. If it is determined in step 104 that the SAT entry does correspond to a valid scheduling list, a further test is performed in step 108 to determine if a cell associated with the respective scheduling list is queued for dispatch. If no cell is queued for dispatch, as indicated in step 110, the pace counter is tested to determine if the counter value equals 0. If the counter value equals 0, the counter value is left unchanged and the respective SAT timeslot is assigned to dynamic bandwidth as illustrated in step 106. The SAT index counters are then incremented upon the arrival of the next cell clock as indicated in step 100. If the test of the pace counter in step 110 reveals that the pace counter is not equal to 0, as indicated in step 112, the pace counter is decremented and the respective SAT timeslot is assigned to dynamic bandwidth as illustrated in step 106. The SAT index counters are then incremented upon the arrival of the next cell clock.

If the test of step 108 reveals that a cell associated with the respective scheduling list is queued for transmission, the pace counter is tested to determine if the counter value equals 0 as illustrated in step 114. If the pace counter is not equal to zero, an enqueued cell for the respective scheduling list is not dispatched to the switch fabric and, as indicated in step 112, the pace counter is decremented. Following the decrementing of the pace counter in step 112, the respective SAT timeslot is assigned to dynamic bandwidth as depicted in step 106. The SAT index counters are then incremented upon the arrival of the next cell clock as illustrated in step 100.

If a cell associated with the respective scheduling list is enqueued for dispatch, as indicated by step 108, and the pace counter is equal to 0, as reflected by the test of step 114, the first cell queued for dispatch for the respective scheduling list is forwarded to the data switch 10 of the switch fabric 9 as illustrated in step 116. Following dispatch of the cell to the switch fabric, the pace counter is preset to the pace limit as illustrated in step 118. Thereafter as indicated in step 100, the SAT index counter is incremented upon the arrival of the next cell clock.

The foregoing method is applied in parallel for each of the SAT's associated with the respective TSPP's 14.

As a consequence of the above described technique, the first cell that is scheduled for dispatch will be forwarded to the switch fabric upon recognition of the next SAT entry for the respective scheduling list when the pace counter is equal to 0. Additionally, due to the fact that the pace counter is decremented each time the respective SAT entry is recognized (unless it is already equal to 0), even if no cells are available for dispatch, an arriving cell is more likely (depending upon the SAT entry assignments) to arrive at a time when the pace counter has been decremented to zero thereby permitting the cell to be dispatched upon recognition of the next SAT entry for the respective scheduling list. Since the SAT entries employing the present pacing technique occur more frequently than would occur without the overallocation of bandwidth within the SAT, average cell latency is shorter than would be experienced in a system employing a SAT without the present pacing technique.

The presently disclosed pacing mechanism also allows assignment of bandwidth to a scheduling list less than that which would be assignable without this mechanism. In particular, the minimum increment of bandwidth assignable in a system using a switch allocation table for bandwidth allocation corresponds to the bandwidth assignable in one time slot within the table. With the pacing mechanism it is possible to skip full cycles or non-integer multiples of cycles through the SAT table by storing one or more scheduling list numbers in the SAT table and storing a number greater than the number of scheduling list entries in the pace limit counter. For example, if only one SAT table entry had a selected scheduling list number and the pace limit for that scheduling list was set to 1, a time slot would only be allocated for the scheduling list every two cycles through the SAT table although the latency for cell dispatch would not exceed 1 SAT table cycle following countdown of the pace counter. Latency may be further reduced by overallocating bandwidth to the SAT table for the specified scheduling list. By way of example, latency may be reduced by assigning the specified scheduling list number to 2 SAT entries within the SAT table and setting the pace limit to 3. In this circumstance, cells would be dispatched every 2 SAT table cycles, however, once the pace-counter counted down to 0, the latency would be no more than the time to cycle through ½ of the SAT table.

Via the presently disclosed pacing mechanism, flexibility is provided in the ability to allocate bandwidth based upon the needs of specific scheduling lists. Additionally, delays through the switch are reduced and bursty cell traffic is advantageously paced or smoothed in accordance with predefined bandwidth allocations.

The foregoing description is illustrative of a novel method and apparatus for allocating bandwidth and reducing cell latency in a network switch. Other embodiments of and variations from the presently disclosed methods and apparatus will be apparent to those of ordinary skill in the art without departing from the inventive concepts contained herein. Accordingly, the present invention is to be viewed as embracing each and every novel feature and novel combination of features present in or possessed by the methods and apparatus herein disclosed and is to be viewed as limited solely by the scope and spirit of the appended claims.

What is claimed is:

1. A method for allocating bandwidth in a network switch having a plurality of input ports, a plurality of output ports and a switch fabric for selectively forwarding cells queued for transmission in a queue at one of said plurality of input ports to at least one of said plurality of output ports comprising the steps of:

repeatedly retrieving from a table in a memory, in a predetermined sequence, a plurality of table entries, at least one of said plurality of table entries having a first predetermined value;

in a first dispatching step, dispatching a first cell associated with said first predetermined value and queued for transmission to said switch fabric upon retrieval of one of said table entries having said first predetermined value;

in a second dispatching step, dispatching a second cell associated with said first predetermined value to said switch fabric following queuing of said second cell on a queue associated with said first predetermined value and upon retrieval of a predetermined plurality of table entries having said first predetermined value if said second cell is queued for dispatch prior to retrieval of said predetermined plurality of table entries having said first predetermined value.

2. The method of claim 1 wherein said second dispatching step further includes the step of dispatching a second cell associated with said first predetermined value to said switch fabric following queuing of said second cell on a queue associated with said first predetermined value and upon retrieval of the next table entry having said first predetermined value if said second cell is queued for dispatch following retrieval of said predetermined plurality of table entries having said first predetermined value.

3. The method of claim 1 wherein said repeatedly retrieving step further comprises the steps of:

storing within said memory said plurality of table entries, wherein each of said table entries within said memory has a predetermined address;

repeatedly generating a sequence of addresses; and accessing said table entries in accordance with said sequence of addresses.

4. The method of claim 1 wherein said queue comprises a plurality of queues at at least some of the time and said step of dispatching a cell associated with said first predetermined value comprises the step of dispatching said cell from one of said plurality of queues.

5. The method of claim 4 wherein said method further comprises the step of selecting each queue of said plurality of queues in a predetermined sequence and wherein said step of dispatching said cell associated with said first predetermined value comprises the step of dispatching said cell from the selected queue of said plurality of queues.

6. The method of claim 5 wherein said step of selecting each queue of said plurality of queues in a predetermined sequence comprises the step of selecting the respective queue of said plurality of queues in a round robin sequence.

7. The method of claim 5 wherein said step of dispatching said cell from the selected queue of said plurality of queues in said predetermined sequence further comprises the step of dispatching said cell from the selected queue of said plurality of queues on a first in first out (FIFO) basis within each queue of said plurality of queues.

8. The method of claim 1 wherein said method further includes the steps of:

receiving said first cell at said one of said plurality of input ports and storing said first cell in said queue;

subsequent to receipt of said first cell, receiving a second cell at said one of said input ports and storing said second cell in said queue.

9. The method of claim 1 wherein said table entries having said first predetermined value are selectively stored within said table such that said table entries having said first predetermined value are retrieved substantially periodically.

10. The method of claim 1 wherein at least two of said plurality of table entries contain said first predetermined value.

11. The method of claim 10 wherein said dispatching step further comprises the step of:

dispatching a cell associated with said first predetermined value and queued for transmission to said switch fabric following retrieval of said predetermined plurality of table entries having said first predetermined value, upon retrieval of the next table entry having said first predetermined value.

12. A method for allocating bandwidth in a network switch having a plurality of input ports, a plurality of output ports and a data switch for selectively forwarding cells from one of said plurality of input ports to one of said plurality of output ports comprising the steps of:

repeatedly retrieving from a table stored in memory, in a predetermined sequence, a plurality of table entries, at least one of said plurality of table entries having a first predetermined value, said first predetermined value being associated with a queue of said input port;

upon retrieval of each of said table entries having said first predetermined value, testing a counter value to determine if said counter value is equal to a second predetermined value;

if said counter value is equal to said second predetermined value and a cell is queued for transmission in a queue associated with said predetermined value;

forwarding said queued cell from said queue associated with said first predetermined value to said data switch for delivery to at least a selected one of said output ports; and setting said counter value to a third predetermined value; and if said counter value is not equal to said second predetermined value, updating said counter value.

13. The method of claim 12 wherein said step of updating said counter value comprises the step of modifying said counter value such that said counter value approaches or equals said second predetermined value.

14. The method of claim 12 wherein said second predetermined value equals 0 and said modifying step comprises the step of decrementing said counter value.

15. The method of claim 12 wherein said network switch includes a table for each of said plurality of input ports and said method includes the step of repeating each of the steps recited in claim 12 for each of said tables and wherein said first predetermined value for each of said tables may comprise a different first predetermined value.

16. The method of claim 12 wherein said at least one table entry is selectively stored within said table such that said table entries having said first predetermined value are retrieved substantially periodically.

17. The method of claim 12 wherein at least two of said plurality of table entries contain said first predetermined value.

18. The method of claim 13 wherein said dispatching step further comprises the step of:
dispatching a cell associated with said first predetermined value and queued for transmission to said switch fabric following retrieval of said predetermined plurality of table entries having said first predetermined value upon retrieval of the next table entry having said first predetermined value.

19. A network switch having a plurality of input ports, a plurality of output ports, a switch fabric in electrical communication with said pluralities of input and output ports, wherein said switch fabric is operative to dispatch a cell received from one of said input ports to at least one of said output ports, said network switch comprising:
a queue having a queue identifier of a first predetermined value, said queue being associated with said one of said input ports;
a queue identifier generator operative to repetitively output a sequence of queue identifiers, said sequence containing at least one queue identifier having said first predetermined value;
a cell dispatch controller operative to dispatch a cell from said queue within said one of said input ports to said switch fabric following the output by said queue identifier generator of a predetermined plurality of queue identifiers having said first predetermined value after dispatch of a prior cell from said queue if said cell is queued on said queue prior to the output of said predetermined plurality of queue identifiers having said first predetermined value.

20. The network switch of claim 19 wherein said cell dispatch controller is further operative to dispatch a cell from said queue within said one of said input ports to said switch fabric following queuing of a cell on said queue and upon the output by said queue identifier generator of the next queue identifier having said first predetermined value if at least said predetermined plurality of queue identifiers having said first predetermined value have been output by said queue identifier generator since the dispatch of a prior cell from said queue.

21. The network switch of claim 19 wherein said queue identifier generator comprises:
an address generator operative to repeatedly generate a series of addresses in a first predetermined sequence; and
a memory containing a table having a plurality of table entries, wherein selected ones of said table entries comprise said queue identifiers, said memory being responsive to said address generator to output one of said table entries in response to each of said addresses, said table containing at least two queue identifiers having said first predetermined value.

22. The network switch of claim 20 wherein said address generator further comprises a counter which is operative to output sequential addresses in response to a clock input.

23. The network switch of claim 19 wherein said queue comprises a plurality of queues at at least some of the time.

24. The network switch of claim 23 further comprising a cell dispatch controller operative to dispatch a cell from each queue of said plurality of queues in a predetermined sequence.

25. The network switch of claim 24 wherein said cell dispatch controller is operative to dispatch a cell from each queue of said plurality of queues in a round robin sequence.

26. The network switch of claim 19 wherein said queue identifier generator is operative to output queue identifiers having said first predetermined value substantially periodically.

27. The network switch of claim 19 wherein at least two of said queue identifiers have said first predetermined value.

28. The network switch of claim 27 wherein said dispatching step further comprises the step of:
dispatching a cell associated with said first predetermined value and queued for transmission to said switch fabric following retrieval of said predetermined plurality of queue identifiers having said first predetermined value upon retrieval of the next queue identifier having said first predetermined value.

29. A network switch for forwarding a cell received from one of a plurality of input ports of said network switch to one of a plurality of output ports of said network switch via a switch fabric comprising:
an address generator operative to repeatedly generate a series of addresses in a first predetermined sequence;
a memory containing a table comprising a plurality of table entries and operative in response to said address generator to output one of said table entries in response to an address input, said table containing at least one table entry having a first predetermined value;
a counter containing a counter value;
a storage register containing a second predetermined value;
a queue associated with said first predetermined value for storing at least one cell for transmission to at least one of said output ports;
a bandwidth controller operative in response to the output of each of said plurality of entries of said first predetermined value from said table to determine if said counter value equals a third predetermined value;
said bandwidth controller being further operative, if said counter value is equal to said third predetermined value and a cell is queued for transmission in said queue to:
dispatch said cell from said queue to said switch fabric; and
set said counter value to said second predetermined value; and
said bandwidth controller being further operative, if said counter value is not equal to said third predetermined value, to update said counter value.

30. The network switch of claim 29 wherein said third predetermined value equals 0 and said bandwidth controller is operative to decrement said counter value if said counter value is not equal to 0.

31. The network switch of claim 29 wherein said second predetermined value is greater than one.

32. The network switch of claim 29 wherein said memory is operative to output table entries having said first predetermined value substantially periodically in response to said address generator.

33. The network switch of claim 29 wherein at least two of said plurality of table entries contain said first predetermined value.

34. The network switch of claim 33 wherein said dispatching step further comprises the step of:
dispatching a cell associated with said first predetermined value and queued for transmission to said switch fabric following retrieval of said predetermined plurality of table entries having said first predetermined value upon retrieval of the next table entry having said first predetermined value.

35. A method for allocating bandwidth in a network switch having a plurality of input ports, a plurality of output ports and a switch fabric for selectively forwarding cells queued for transmission in at least one queue associated with one of said plurality of input ports to at least one of said plurality of output ports comprising the steps of:

generating a continuous sequence of scheduling list identifiers, wherein at least one scheduling list identifier of said sequence has a first predetermined value which is associated with said at least one queue;

detecting said scheduling list identifiers;

dispatching to said switch fabric a cell available for dispatch from one of said at least one queue and associated with said first predetermined value upon detection of a predetermined plurality of scheduling list identifiers having said first predetermined value following the dispatch of a prior cell from said at least one queue.

36. The method of claim 35 wherein said dispatching step further comprises the step of dispatching a cell which becomes available for dispatch from said at least one queue after detection of said predetermined plurality of scheduling list identifiers having said first predetermined value since the dispatch of said prior cell, upon detection of the next scheduling list identifier having said first predetermined value.

* * * * *

UNITED STATES PATENT AND TRADEMARK OFFICE
CERTIFICATE OF CORRECTION

PATENT NO.    : 5,982,771  
DATED         : November 9, 1999  
INVENTOR(S)   : Stephen A. Caldara, et al.

Page 1 of 1

It is certified that error appears in the above-identified patent and that said Letters Patent is hereby corrected as shown below:

<u>Column 14,</u>
Line 55, "claim 12", should read --claim 13--; and

<u>Column 15,</u>
Line 56, "claim 20", should read --claim 21--.

Signed and Sealed this

Tenth Day of July, 2001

*Attest:*

Nicholas P. Godici

*Attesting Officer*

NICHOLAS P. GODICI
*Acting Director of the United States Patent and Trademark Office*